United States Patent [19]
Ito et al.

[11] Patent Number: 5,552,194
[45] Date of Patent: Sep. 3, 1996

[54] EXTRUSION DIE, METHOD OF FORMING MOLDING ON PLATELIKE ARTICLE AND PLATELIKE ARTICLE WITH MOLDING

[75] Inventors: Tosikazu Ito, Obu; Yutaka Yamauchi, Matsusaka, both of Japan

[73] Assignees: Central Glass Company, Limited, Ube; Tokai Kogyo Kabushiki Kaisha, Obu, both of Japan

[21] Appl. No.: 361,417

[22] Filed: Dec. 22, 1994

[30] Foreign Application Priority Data

Dec. 24, 1993 [JP] Japan .................. 5-328411

[51] Int. Cl.$^6$ ............... B29C 47/02; B29C 47/92
[52] U.S. Cl. .................. 428/31; 49/475.1; 49/479.1; 52/204.597; 156/106; 156/244.12; 264/177.10; 264/177.16; 264/252; 264/173.17; 425/113; 425/131.1
[58] Field of Search .................. 264/252, 177.10, 264/177.16–177.20, 173.17; 52/204.597; 425/466, 113, 381, 131.1; 428/31, 34; 156/106–109, 224.12, 244.25; 49/475.1, 479.1

[56] References Cited

U.S. PATENT DOCUMENTS

| | | | |
|---|---|---|---|
| 3,957,406 | 5/1976 | Battersby . | |
| 4,910,071 | 3/1990 | Kunert | 156/108 |
| 4,933,032 | 6/1990 | Kunert | 156/244.25 |
| 5,108,526 | 4/1992 | Cornils et al. . | |
| 5,123,988 | 6/1992 | Iwasa | 156/244.12 |
| 5,137,675 | 8/1992 | Rabe | 264/177.16 |
| 5,267,846 | 12/1993 | Miyama et al. | 264/177.16 |
| 5,273,704 | 12/1993 | Sholl et al. | 264/252 |
| 5,336,349 | 8/1994 | Cornils et al. | 156/500 |
| 5,358,397 | 10/1994 | Ligon et al. | 264/177.19 |
| 5,362,428 | 11/1994 | Tsujino et al. | 156/107 |
| 5,382,395 | 1/1995 | Hoenke | 156/500 |

FOREIGN PATENT DOCUMENTS

| | | |
|---|---|---|
| 0493068 | 7/1992 | European Pat. Off. . |
| 57-158479 | 9/1982 | Japan . |
| 59-154419 | 10/1984 | Japan . |
| 61-129321 | 6/1986 | Japan . |
| 62-155123 | 7/1987 | Japan . |
| 63-15716 | 1/1988 | Japan . |
| 2081618 | 3/1990 | Japan . |
| 2-106427 | 4/1990 | Japan . |
| 4-151225 | 5/1992 | Japan . |
| 4-226321 | 8/1992 | Japan . |
| 4-261822 | 9/1992 | Japan . |
| 4-334435 | 11/1992 | Japan .................. 156/108 |
| 6-8728 | 1/1994 | Japan . |

OTHER PUBLICATIONS

Database WPI, Week 8249, Derwent Publications Ltd. AN 82–05613J & JP–A–57,176,143, Oct. 29, 1982.

*Primary Examiner*—Jeffery R. Thurlow
*Attorney, Agent, or Firm*—Keck, Mahin & Cate

[57] ABSTRACT

The invention relates to a glass plate having a molding formed on a peripheral edge thereof. The present invention provides an extrusion die having first and second void spaces formed therein. The first void space is provided for supplying an adhesive to the peripheral edge, and the second void space is provided for supplying a molding material to the peripheral edge. The first and second void spaces are specifically arranged relative to each other. With this, while the glass plate is moved relative to the extrusion die, the molding is extruded on the peripheral edge simultaneously with the formation of the adhesive layer on the peripheral edge. Thus, the formations of the molding and the adhesive layer are conducted in one production process. With this, the production efficiency is much improved. The present invention further provides a glass plate having an adhesive layer made of a thermoplastic hot melt adhesive and a molding made of a thermoplastic resin, which are formed on a peripheral edge of the glass plate. In the process for producing this glass plate, the heated thermoplastic resin having a specifically controlled temperature is brought into contact with the heated thermoplastic hot-melt adhesive having a specifically controlled temperature. With this, at a boundary between the adhesive layer and the molding, the thermoplastic hot melt adhesive and the thermoplastic resin are fused together and blended with each other. With this, bond strength of the molding to the glass plate is much improved.

8 Claims, 11 Drawing Sheets

EXTRUSION DIE, METHOD OF FORMING MOLDING ON PLATELIKE ARTICLE AND PLATELIKE ARTICLE WITH MOLDING

BACKGROUND OF THE INVENTION

The present invention relates to an extrusion die, a method of forming a frame-like molding on a peripheral edge of a platelike article using the extrusion die, and a platelike article with the molding. As is known, the molding formed on a peripheral edge of a platelike article has various functions such as protective, sealing and decorative functions.

There are various proposals for providing an automotive or architectural glass plate with a frame-like molding, as follows.

JP-A-57-158479 discloses a method of fixing a molding, gasket or the like to a glass plate. In this method, a molding or gasket 3 is fixed to a glass plate 4 by a pressing roller 5 immediately after the molding or gasket 3 is extruded from a die 2 of an extruder 1 (see FIG. 1 of this publication). The pressing roller 5 and the extruder 1 are moved along a peripheral edge of the glass plate 4 for fixing the molding or gasket 3 on the peripheral edge thereof.

JP-A-59-154419 discloses a method of sealing an automotive window glass. In this method, a dry-type seal member 10A or 10B is applied to a peripheral edge of the window glass 3, and then a conventional weatherstrip 2 is fixed to me seal member 10A or 10B so as to cover the peripheral edge. The dry-type seal member 10A or 10B is a thermoplastic hot melt sealing member or an extruded sealing member made of silicone rubber, urethane rubber or the like.

JP-A-61-129321 discloses a molding 21, 22 or 23 which is fixed to a window glass 11, 12 or 13 through an engaging portion 11a, 12a or 13a. With this engaging portion, it is not necessary to use an adhesive for fixing the molding to the window glass.

JP-A-62-155123 discloses a method of forming a dam on a window glass. In this method, a hot melt type dam material is extruded from an extruder, and then the extruded dam material is cooled down or cross-linked on the window glass such that the dam material is directly adhered to the window glass.

JP-A-2-106427 discloses a method of simultaneously forming first and second ribbons on an automotive window glass (see FIG. 9 of this publication). The second ribbon 15 is formed on the first ribbon 12 and is to be adhered to the automotive body (for example, see FIG. 1 of this publication). The first ribbon 12 is designed to cure within a very short time. In contrast, the second ribbon 15 is designed not to cure until the window glass is fixed to an automotive body. That is, the second ribbon 15 is maintained to have plasticity and adhesion until the window glass is fixed to an automotive body.

JP-A-63-15716 discloses a method of forming a molding on a window member. In this method, firstly, an adhesive layer 8 is formed on a peripheral edge of the window member 3. Secondly, the window member 3 is inserted between a fixed mold 1 and a movable mold 2. Thirdly, a molding 9 is formed on the adhesive layer by injection molding.

JP-A-4-151225 discloses a method of fixing a molding to a peripheral edge of a window glass by rotating the window glass relative to an extruder's die fixed at one position.

JP-A-4-226321 discloses a method of preparing a glass plate with a gasket. In this method, a plastic gel is applied to a peripheral edge of the glass plate, and then this plastic gel is heated so as to melt the same. The plastic gel contains, as essential components, polyvinyl chloride and a plasticizer.

U.S. Pat. No. 5,108,526 discloses an apparatus for extruding a polymer profile directly on a peripheral edge of one major surface of a glass plate. Tills apparatus has a means for modifying a polymer flow through one of polymer supply channels. The modification takes place as a function of the radius of curvature (R) of the path covered by an extrusion die of the apparatus.

JP-A-6-8728 discloses a method of producing a window glass having a molding. In this method, while a synthetic resin material is extruded from a die onto a peripheral edge of one surface of the window glass, a die is moved along a peripheral edge of the window glass and the locus and angle of the die 3 are corrected.

JP-A-4-261822 discloses a window glass with a molding, a method of producing this window glass, and an apparatus for producing this window glass. In this method, at first, a resin adhesive 4 is applied to a peripheral edge of a window glass 3. Then, a portion of the peripheral edge of the window glass 3 is inserted into a cavity 17 of a die 13. Then, an extruded molding 5 is continuously applied to the peripheral edge of the window glass 3, simultaneously with the extrusion of the molding 5, while the window glass 3 is suitably rotated relative to an extruder. However, there is an increasing demand to more efficiently improve adhesion of the molding to the peripheral edge of the window glass.

SUMMARY OF THE INVENTION

It is therefore an object of the present invention to provide a window glass formed with a molding, which molding is substantially improved in adhesion to the window glass and is substantially free from creases.

It is another object of the present invention to provide an improved method for efficiently improving adhesion of the molding to the window glass.

It is still another object of the present invention to provide an improved extrusion die with which the molding is formed on a peripheral edge of the window glass, subs. tantially simultaneously with the application of an adhesion to the peripheral edge.

According to a first aspect of the present invention, there is provided an extrusion die through which a molding material is extruded onto a peripheral edge portion of a platelike article while said extrusion die and said platelike article are moved relative to each other, said platelike article having first and second major surfaces which are opposed to each other and an edge surface connecting said first and second major surfaces with each other, said peripheral edge portion having a peripheral portion of each of said first and second major surfaces and said edge surface, said extrusion die comprising:

first means for forming an adhesive layer on said peripheral edge portion; and second means for forming a molding on said peripheral edge portion so as to cover said adhesive layer, wherein said first means and said second means are so arranged relative to each other such that said molding and said adhesive layer are substantially simultaneously formed on said peripheral edge portion.

According to a second aspect of the present invention, there is provided a method of producing a platelike article having an adhesive layer and a molding, said adhesive layer being formed on a peripheral edge of said platelike article, said molding covering said adhesive layer and being for,ned on said peripheral edge, using an extrusion die comprising a first-space for supplying an adhesive to said peripheral edge and a second space for supplying a molding material to said peripheral edge, said method comprising the steps of:

(a) inserting said peripheral edge into said first and second spaces;

(b) moving said platelike article relative to said extrusion die while said peripheral edge is kept inserted in said first and second spaces;

(c) applying said adhesive from said first space to said peripheral edge so as to form said adhesive layer thereon; and (d) extruding said molding material from said second space onto said adhesive layer while the step (c) is conducted, wherein said first and second spaces are so arranged relative to each other such that said molding and said adhesive layer are substantially simultaneously formed on said peripheral edge and that said adhesive layer is covered with said molding.

According to a third aspect of the present invention, there is provided a platelike article having an adhesive layer and a molding, said adhesive layer being formed on a peripheral edge of said platelike article. said molding covering said adhesive layer being formed on said peripheral edge, said adhesive being a thermoplastic hot melt adhesive, said molding being a thermoplastic polymer, a boundary between said adhesive and said molding having a rough surface, said adhesive and said molding being fused together at said boundary, said platelike article being prepared in accordance with the reelhod of the second aspect of the present invention.

DESCRIPTION OF THE PREFERRED EMBODIMENTS

With reference to FIGS. 1–18, an extruder having an improved extrusion die for extruding a molding on a peripheral edge of a window glass, a method of forming the molding thereon, and a glass plate with the molding will be described in the following in accordance with the present invention. In the invention, it is needless to say that the window glass may be other platelike articles.

According to the invention, an adhesive is applied or extruded onto a peripheral edge of a window glass, and at substantially the same time as this application, a molding is extruded onto the peripheral edge. It is an important feature of the present invention that these two procedures can be efficiently conducted in one production process, using an improved single extrusion die. The adhesive is applied to the peripheral edge for improving adhesion of the molding to the window glass. In the invention. this adhesion can be arbitrarily controlled and becomes sufficiently strong, as will be explained hereinafter in detail. Furthermore, the extruded molding becomes superior in surface finish and dimensional precision.

In the invention, the extrusion die is moved relative to the window glass such that the extrusion die moves along the peripheral edge of the window glass. As will be exemplified hereinafter, it is preferable that the extrusion die is fixed at one position and the window glass is suitably moved relative to the extrusion die. However, according to circumstances, the window glass may be fixed at one position and the extrusion die may be moved along the peripheral edge of the window glass.

In the invention, examples of the molding material are thermoplastic resins such as vinyl chloride resin, thermoserring resins such as urethane resin, and thermoplastic olefin or styrene elastomers.

In the invention, examples of the adhesive are thermoserring adhesives such as an α-cyanoacrylate adhesive (ARON α which is a trade name of TOA GOSEI CHEMICAL INDUSTRY CO., LTD.) and a modified nylon adhesive (ARON MIGHTY FS which is a trade name of TOA GOSEI CHEMICAL INDUSTRY CO., LTD.), thermoplastic (hot melt) adhesives such as a copolymerized polyester adhesive (AROMELT FES which is a trade name of TOA GOSEI CHEMICAL INDUSTRY CO., LTD.), a butyl adhesive (MELTRON HB which is a trade name of DIABOND INDUSTRY CO., LTD., or HAMATIGHT HOTMELT M-120 which is a trade name of YOKOHAMA RUBBER CO., LTD.), a mixture of at least two thermoplastic adhesives of the same type, and a mixture of these and a vinyl chloride resin.

According to the use of a specific extrusion die of the present invention, a thermosetting adhesive which is very low in viscosity, compared with the molding material, can be applied to the window glass substantially simultaneously with the extrusion of the molding material thereon. Furthermore, according to the present invention, even if a thermoplastic adhesive is used, it is possible that the adhesive layer and the molding have two different colors. According to the present invention, bond strength of the molding to the window glass is much more improved than that of a conventional molding formed on a window glass, and is several times greater than 1 kg/cm$^2$. According to the invention, the molding formed on a window glass has a substantially uniform cross section, is substantially improved in dimensional precision, and does not have scratches nor creases. In the invention, a molding can be formed on a window glass in an automated, labor-reducing and efficient way.

Figure 14:
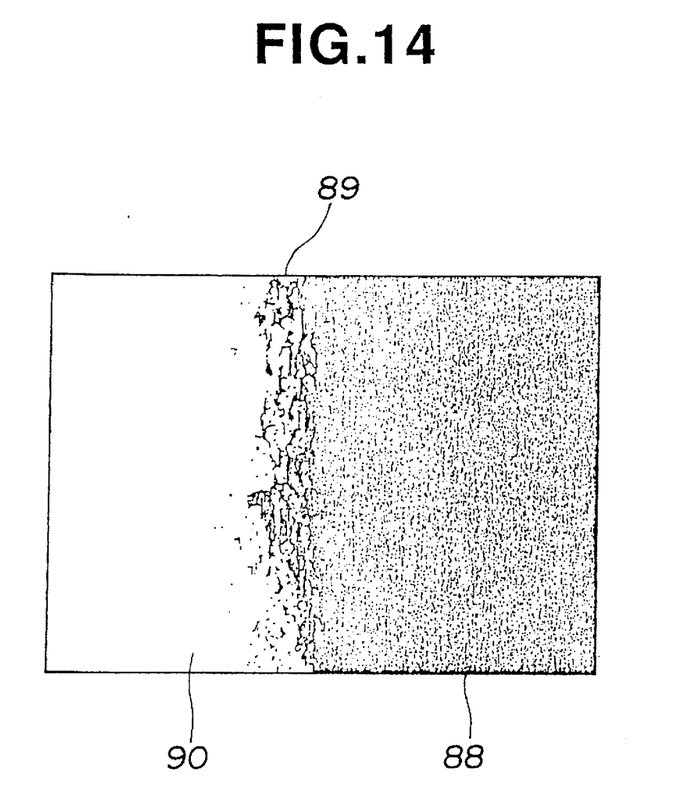
FIG. 14 is a schematic, sectional view which is a reproduction of a photograph of 100 magnifications, showing a boundary between the adhesive layer and the molding which are shown in FIG. 11.
Figure 15:
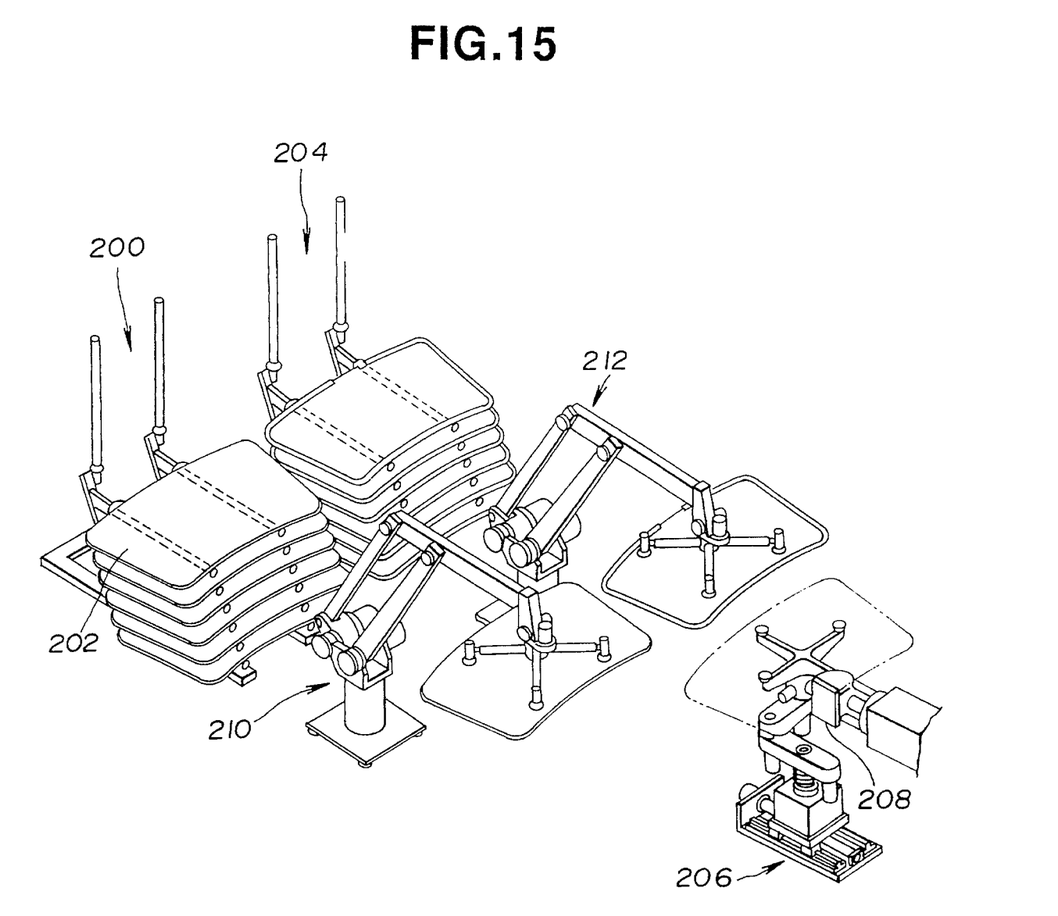
FIG. 15 is a perspective view showing an apparatus arrangement for forming an adhesive layer and extruding a molding on each window glass.

As will be clarified hereinafter. in case that a thermoplastic hot melt adhesive is used as the adhesive and a thermoplastic resin (polymer) is used as the molding material in the invention, the boundary 89 between the adhesive layer 90 and the molding 88 becomes uneven (see FIG. 14). Furthermore, at this boundary 89, the thermoplastic hot melt adhesive of the adhesive layer 90 and the thermoplastic resin of the molding 88 are fused together and blended with each other. With this, adhesion of the molding to the adhesive layer and thus to the window glass is much improved, considering that the adhesive layer is made of a thermoplastic hot melt resin. In other words, the molding is firmly anchored to the adhesive layer. As well as the above combination of the specific compositions for the adhesive layer and the molding, a specific extrusion die according to the invention also contributes to provide the above boundary. In other words, according to the invention, a heated adhesive layer having a specifically controlled temperature, for example, within a range from about 125° C. to about 160° C., is applied to the peripheral edge of a window glass, and, at substantially the same time as this application, a heated molding having a specifically controlled temperature, for example, within a range from about 125° C. to about 160° C., is extruded onto the adhesive layer. Therefore, when the molding material is brought into contact with the adhesive layer, the temperature of the adhesive layer and the temperature of the molding material are maintained as substantially the same as the above specifically controlled temperatures. In conclusion, we have unexpectedly found that, when a thermoplastic resin (molding material) having the above specifically controlled temperature is brought into contact with a thermoplastic hot melt adhesive (the adhesive material) having the above specifically controlled temperature, the boundary therebetween becomes uneven and, at this boundary, the adhesive material and the molding material are fused together and blended with each other, as is schematically shown in FIG. 14.

Figure 1:
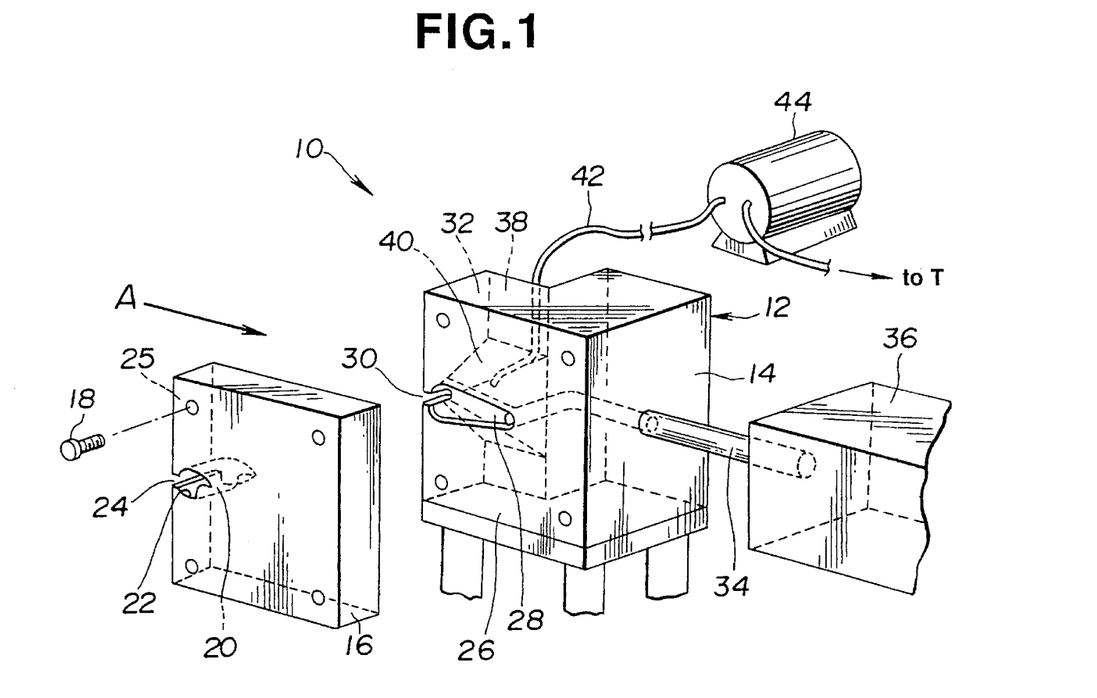
FIG. 1 is an exploded perspective view showing an example of an extrusion die arrangement according to the present invention.

As is seen from FIG. 1, there is provided an example of an extruder arrangement according to the present invention.

Figure 6:
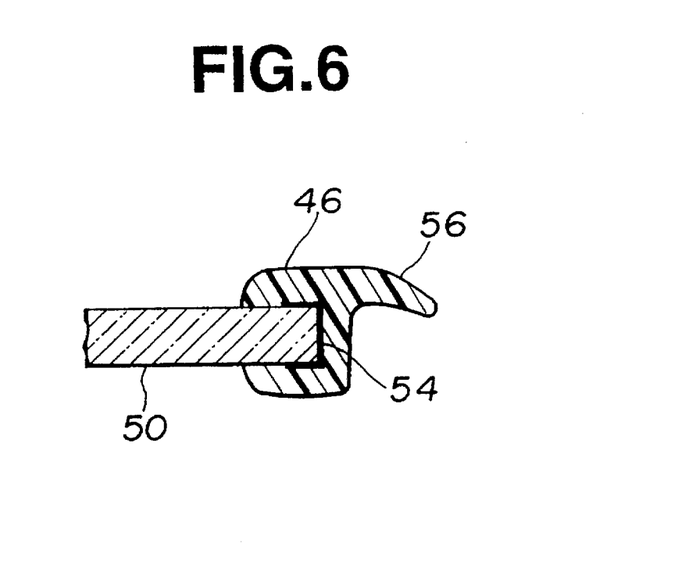
FIG. 6 is a sectional view of a window glass on which an adhesive layer and the molding have been formed using the extrusion die shown in FIG. 2.

As will be clarified hereinafter, by the use of this extruder arrangement, a molding is extruded on a peripheral edge of a window glass, substantially simultaneously with the application of an adhesive to the peripheral edge. With this, as is shown in FIG. 6, the adhesive layer is covered with the molding throughout the peripheral edge of the window glass. It is preferable that this extruder arrangement is used for applying a thermosetting adhesive and for extruding a molding material.

As is shown in FIG. 1, designated by numeral 10 is an extruder arrangement for extruding a molding onto a peripheral edge of a window glass. This extruder 10 has an extrusion die 12 for imparting certain shapes to a molding material. This extrusion die 12 has a major portion 14 and a minor portion 16. The minor portion 16 is exchangeably or detachably attached to the major portion 14 through a plurality of bolts 18 (only one is shown). The minor portion 16 has a void space 20 formed therethrough. This void space 20 has a first opening (orifice) 22 for imparting a certain specific shape to the molding material and a second opening 24 which is formed on a side wall surface 25 of the minor portion 16 and sized so as to snugly receive the peripheral edge of a window glass. With this, an overflow of the molding material and the adhesive from the second opening 24 is substantially suppressed. According to need, the minor portion 16 is replaced by another one having an orifice of a different shape. The major portion 14 is formed on a first wall surface 26 thereof with a void space or notch 28 for supplying the molding material to the void space 20. In the invention, the void spaces 20 and 28 may become filled with the molding material, during the extrusion. The void space 28 has an opening 30 which is formed on a side wall surface 32 of the major portion 14 and sized so as to snugly receive the peripheral edge of a window glass. When the extrusion die is assembled (see FIG. 2), the void space 28 of the major portion 14 is united with the void space 20 of the minor portion 16, and the opening 30 of the major portion 14 is aligned with and united with the second opening 24 of the minor portion 16. A molding material supply passage 34 is provided between an extruder 36 and the void space 28 for the purpose of supplying the molding material from the extruder 36 to the void space 28. Thus, the molding material supplied from the extruder 36 passes through the passage 34, then through the void space 28 and then through the void space 20, and is extruded from the opening 22. The major portion 14 is generally L-shaped, as evident when viewed from above in FIG. 1. The major portion 14 is formed on a second wall surface 38 thereof o with a void space (notch) 40 which is generally pyramid in shape, for the purpose of receiving an adhesive supply pipe 42 in the void space 40. The void space 40 has a side opening (not shown in FIG. 1 for simplicity) formed on the side wall surface 32, for receiving the peripheral edge of a window glass in the void space 40. It should be noted that this side opening of the void space 40 is united with the openings 24 and 30. With this, the peripheral edge of a window glass is inserted into the extrusion die 12, without obstacle. The adhesive supply pipe 42 is connected to an adhesive tank (T) through a pump 44.

Figure 2:
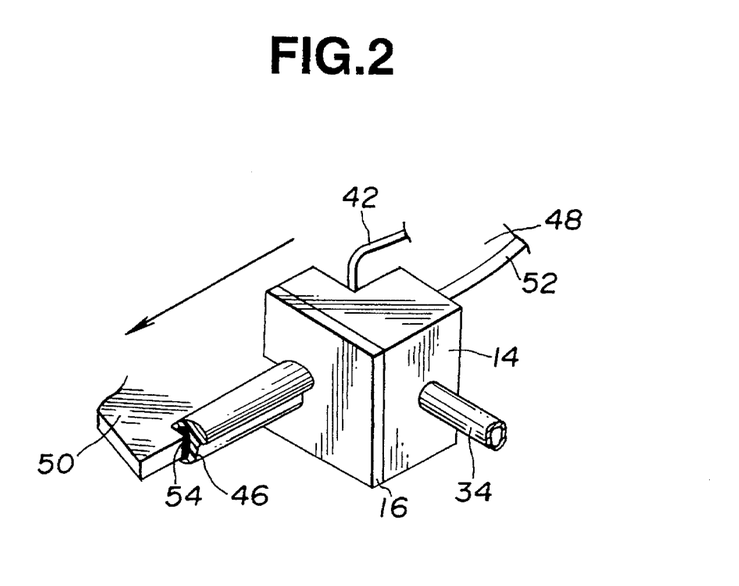
FIG. 2 is a perspective view showing an assembled condition of the extrusion die of FIG. 1 and an extruded molding on a peripheral edge of a window glass.

FIG. 2 is a fragmentary perspective view showing a condition in which a molding 46 is extruded onto a peripheral edge 48 of a window glass 50. Designated by numeral 52 is an edge surface of the window glass 50. Designated by numeral 54 is an adhesive layer which has been applied substantially simultaneously with the extrusion of the molding 46. As the window glass 50 is moved in the direction of the arrow of FIG. 2 relative to the extrusion die 12, the adhesive layer 54 and the molding 46 are continuously applied to the peripheral edge 48.

Figure 16:
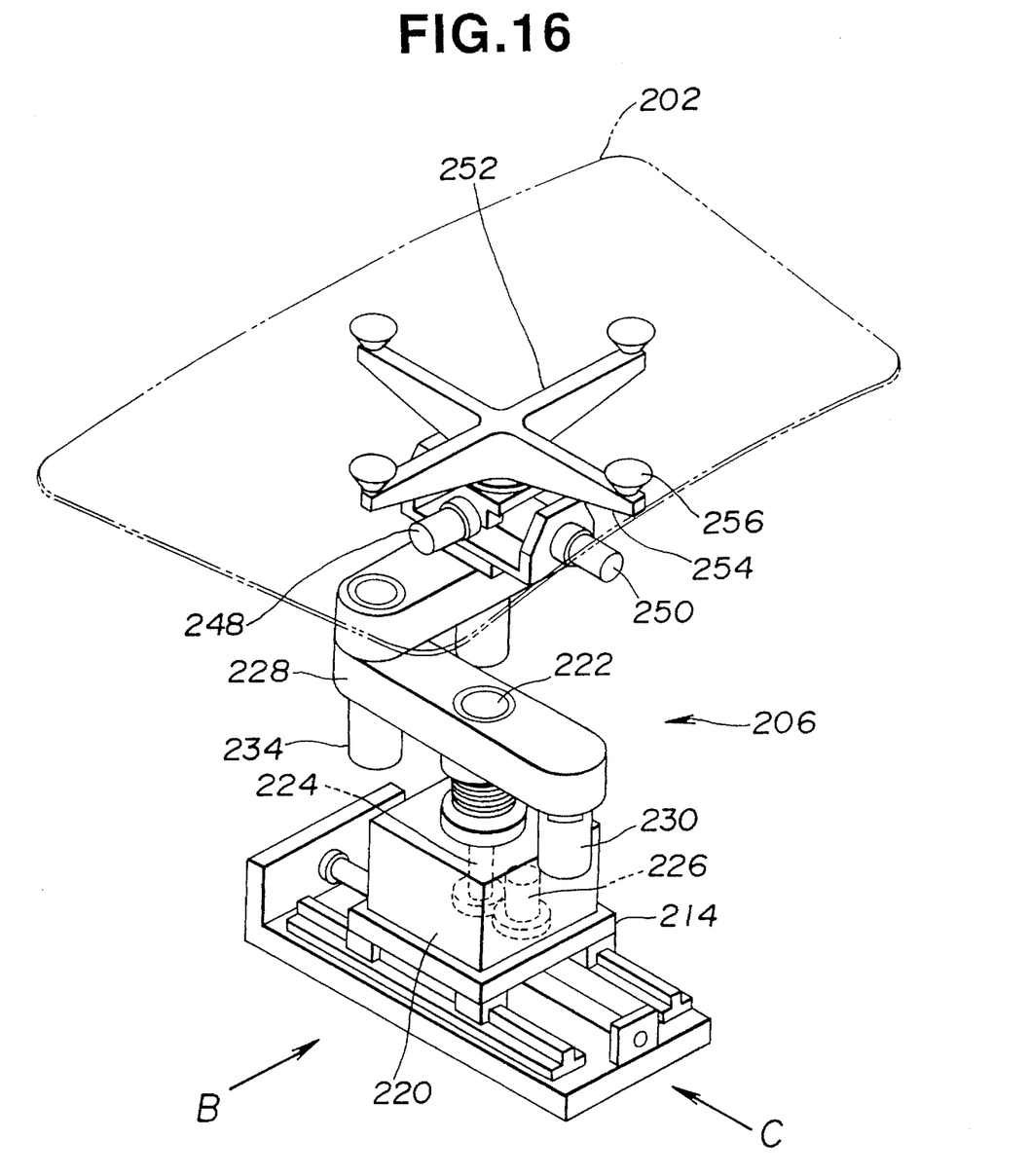
FIG. 16 is a perspective view showing a device for holding a window glass.

It is usual that an automotive window glass has straight peripheral edge portions and curved corner portions (see FIG. 16). In the invention, the moving speed of the window glass and the extrusion rate of the extruder are respectively suitably controlled under different circumstances. If the moving speed and the extrusion rate at the curved corner portions are respectively maintained as the same as those at the straight peripheral edge portions, the amount of the extruded molding material at the curved corner portions becomes too little or insufficient to maintain the uniform cross section of the molding throughout the peripheral edge of the window glass. Therefore, according to the invention, the ratio of the extrusion rate to the moving speed, at the curved corner portions, may be controlled to be higher than that at the straight peripheral edge portions so as to obtain the uniform cross section of the molding throughout the peripheral edge of the window glass. As is known, the extrusion rate is adjusted by changing the rotational speed of a screw(s) of the extruder.

Figure 3:
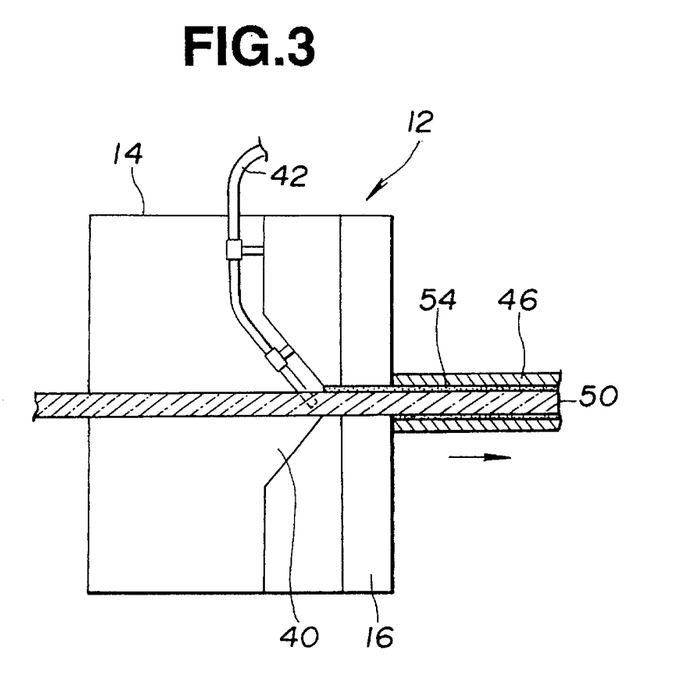
FIG. 3 is a fragmentary schematic view taken in the direction of the arrow "A" of FIG. 1, showing a condition in which a molding is extruded substantially simultaneously with the application of an adhesive.

As is seen from FIG. 3, the adhesive supply pipe 42 is fixed at several portions thereof to the major portion 14 of the extrusion die 12. An end portion (mouth) of the pipe 42 is positioned such that, when the peripheral edge 48 of the window glass 50 is inserted into the void space 40, this end portion becomes in abutment with or positioned at least very close to the peripheral edge 48. With this, it is possible to apply an adhesive such as a thermosetting adhesive from this end portion to the peripheral edge 48.

As is schematically shown in FIG. 3, while the window glass is moved in the direction of the arrow in FIG. 3 under a condition in which the peripheral edge 48 of the window glass 50 is inserted into the side openings 24 and 30 of the extrusion die 12, the thermosetting adhesive is applied from the end portion of the adhesive supply pipe 42 to the peripheral edge 48 so as to form an adhesive layer 54 thereon. At substantially the same time as this application, the molding 46 made of, for example, vinyl chloride resin, is extruded on the adhesive layer 54 from the opening 22 of the minor portion 16. The thus formed adhesive layer 54 and the molding 46 on the peripheral edge 48 of the window glass 50 are shown in FIG. 6. When this window glass 50 is fixed to an automotive body, the window glass 50 becomes superior in sealing property, aerodynamics and external appearance. As is shown in FIG. 6, the molding 46 is generally C-shaped so as to cover the peripheral edge 48 of the window glass 50 and may have a lip portion 56 as illustrated. Furthermore, as will be explained hereinafter, it is optional to provide a window glass with a dam 58 (see FIG. 13).

Figure 4:
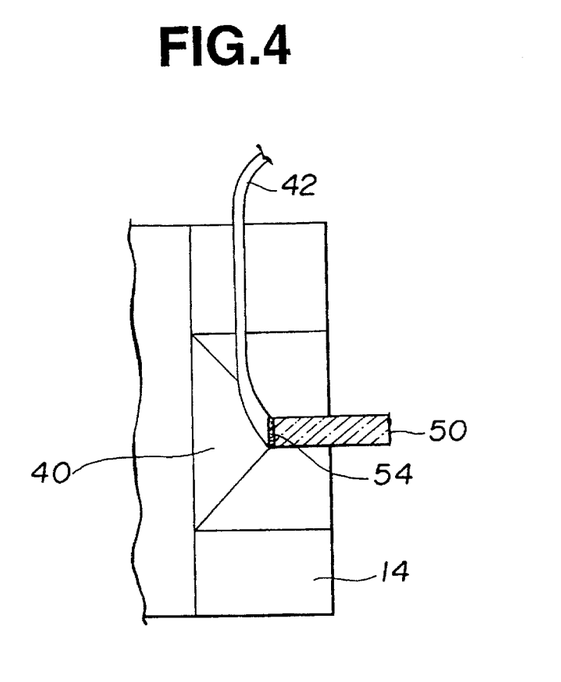
FIG. 4 is a view similar to FIG. 3, but showing another condition in which the adhesive is applied to the peripheral edge of the window glass.

FIG. 4 is a sectional, fragmentary and schematic view showing an exemplary condition in which the end portion of the adhesive supply pipe 42 is in abutment with the peripheral edge 48 of the window glass 50 so as to form the adhesive layer 54 thereon.

Figure 5:
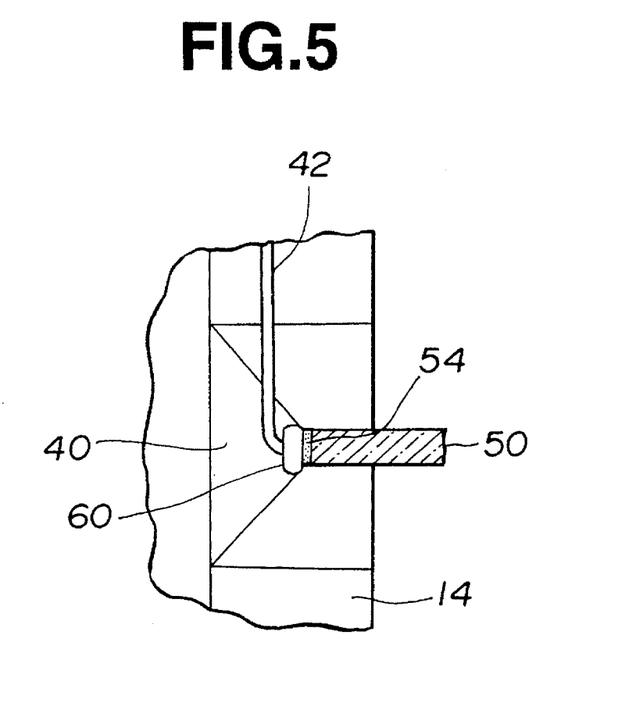
FIG. 5 is a view similar to FIG. 4, but showing a condition in which a sponge-like material is used for the application of the adhesive layer.

FIG. 5 is a sectional, fragmentary and schematic view showing another exemplary condition in which a sponge-like material 60 such as felt is attached to the end portion of the adhesive supply pipe 42 and is in abutment with the peripheral edge 48 of the window glass 50. With the use of this sponge-like material 60, it is possible to more stably or uniformly apply the adhesive to the window glass 50.

Figure 7:
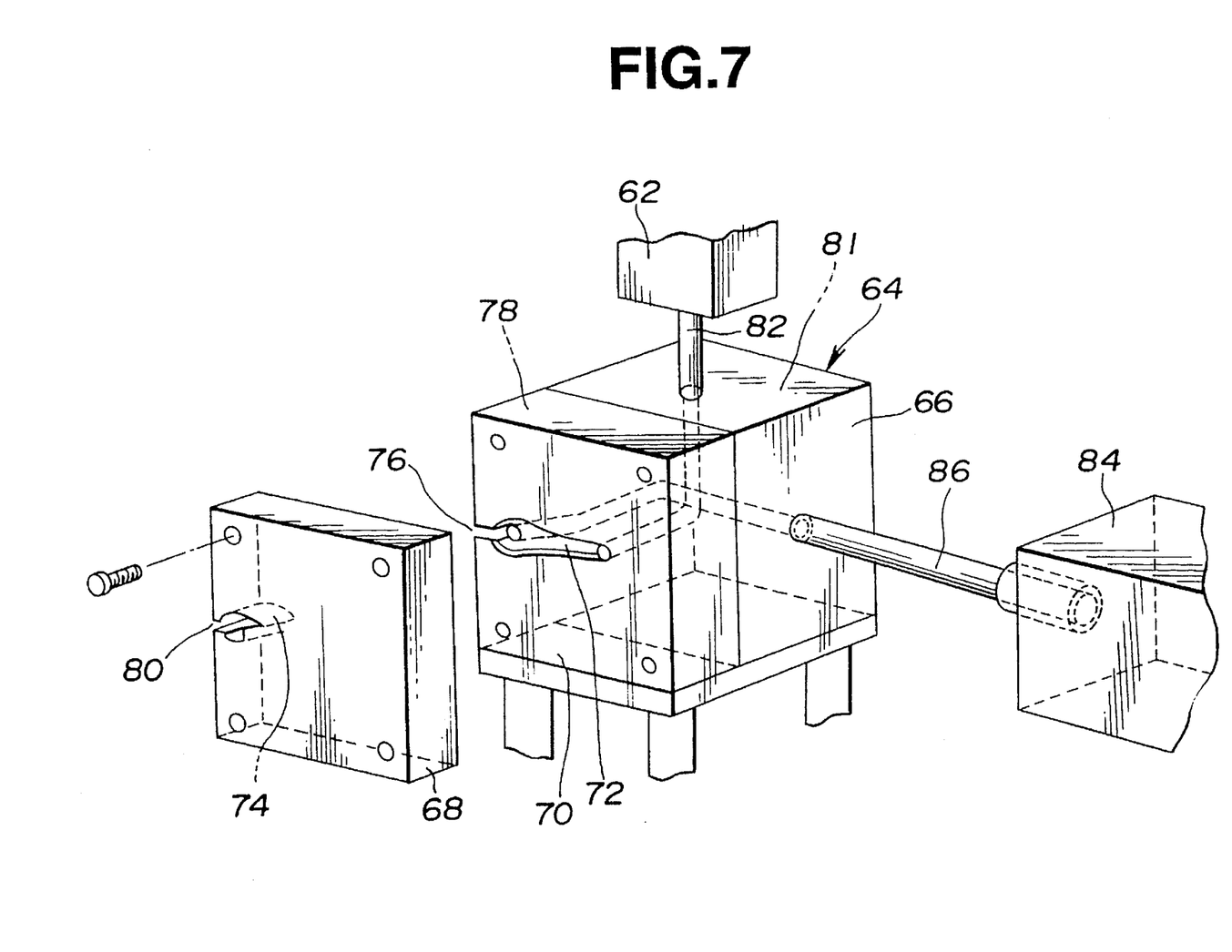
FIG. 7 is a view similar to FIG. 1, but showing another example of an extrusion die according to the present invention.

As is seen from FIG. 7, there is provided another example of an extruder arrangement according to the present invention. This extruder arrangement is preferably used to apply a thermoplastic adhesive and a molding material to a peripheral edge of a window glass. Designated by numeral 62 is a first extruder for extruding a molding onto a peripheral edge of a window glass. This first extruder 62 has an extrusion die 64 for imparting certain shapes to a molding material. This extrusion die 64 has a major portion 66 and a minor portion 68. The minor portion 68 may be identical to the minor portion 16 shown in FIG. 1. The major portion 66 is formed on a first wall surface 70 thereof with a void space or notch 72 for supplying a molding material and optionally an adhesive to a void space 74 of the minor portion 68. The void space 72 has a side opening 76 which is formed on a side wall surface 78 thereof and sized so as to snugly receive a peripheral edge of a window glass. When the extrusion die is assembled, the void space 72 of the major portion 66 becomes united with the void space 74 of the minor portion 68, and the side opening 76 of the major portion 66 is aligned to and united with a side opening 80 of the minor portion 68. Although it is not illustrated in FIG. 7 for simplicity, a side opening is formed on the side wall surface 78. This side opening horizontally extends from the side opening 76 to a second wall surface 81 of the major portion 66 so that the peripheral edge of a window glass is inserted into the extrusion die 64, without obstacle. A molding material supply passage 82 is provided between the first extruder 62 and the void space 72 for the purpose of supplying a molding material such as vinyl chloride resin from the first extruder 62 to the void space 72. A second extruder 84 is connected to the void space 72 through an adhesive supply passage 86. Therefore, as is also seen from FIG. 9, a thermoplastic adhesive is extruded from the adhesive supply passage 86 into the void space 72 by the second extruder 84. However, as is seen from FIG. 10, it is optional that the thermoplastic adhesive is not extruded directly into the void space 72, but to a position immediately upstream the end portion of the void space 72 with respect to a direction in which the window glass is moved relative to the extrusion die 64. Furthermore, it is optional that the thermoplastic adhesive and the molding have different two colors.

Figure 8:
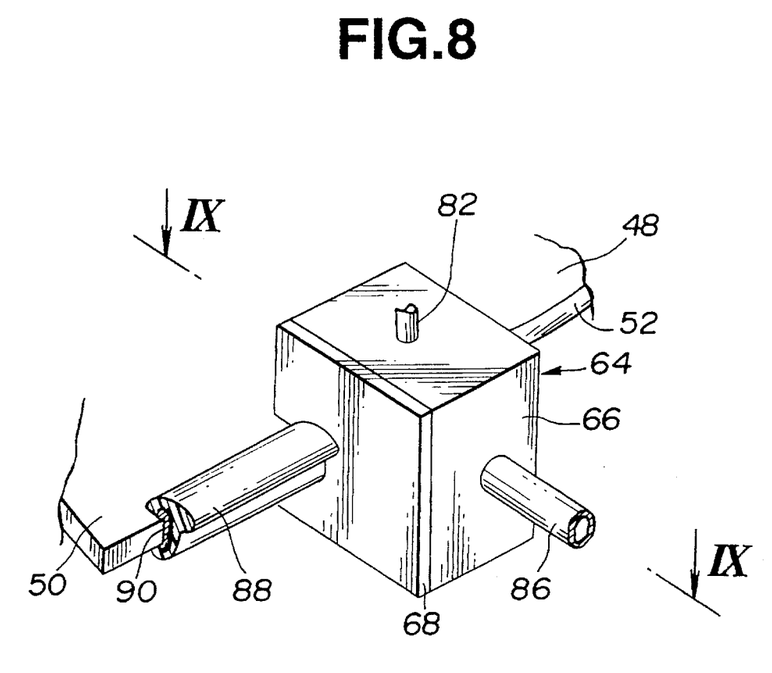
FIG. 8 is a view similar to FIG. 2, but showing an assembled condition of the extrusion die of FIG. 7.
Figure 9:
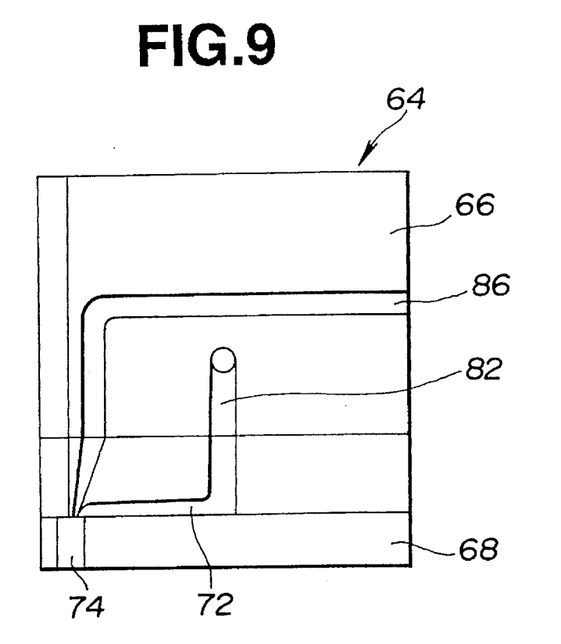
FIG. 9 is a sectional view taken along the line IX—IX of FIG. 8.
Figure 10:
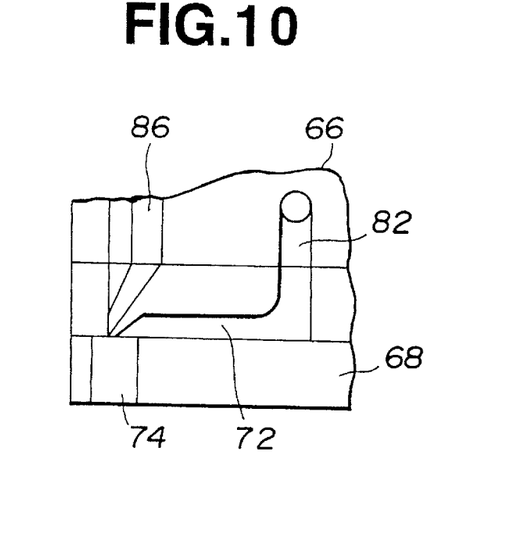
FIG. 10 is a view similar to FIG. 9, but showing a slight modification of an arrangement of adhesive supply passage relative to a molding material supply passage.
Figure 11:
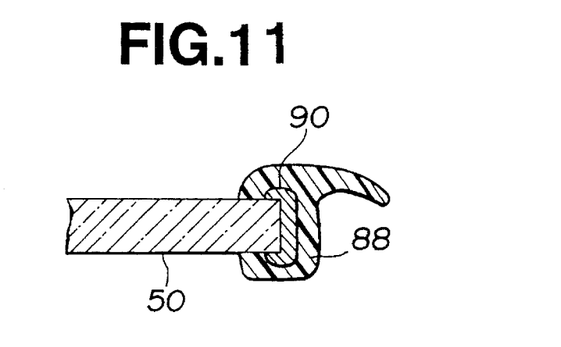
FIG. 11 is a view similar to FIG. 6, but showing a window glass on which an adhesive layer and a molding have been formed using the extrusion die shown in FIG. 8.

FIG. 8 is a perspective view showing the extrusion die 64. Designated by numerals 48, 50 and 52 are the same as those in FIG. 2. With the above extruder arrangement shown in FIG. 7, a molding 88 is extruded on the peripheral edge 48 of the window glass 50, substantially simultaneously with the extrusion of the adhesive layer 90 thereon. The thus formed molding 88 and adhesion layer 90 are shown in FIG. 11.

Figure 12:
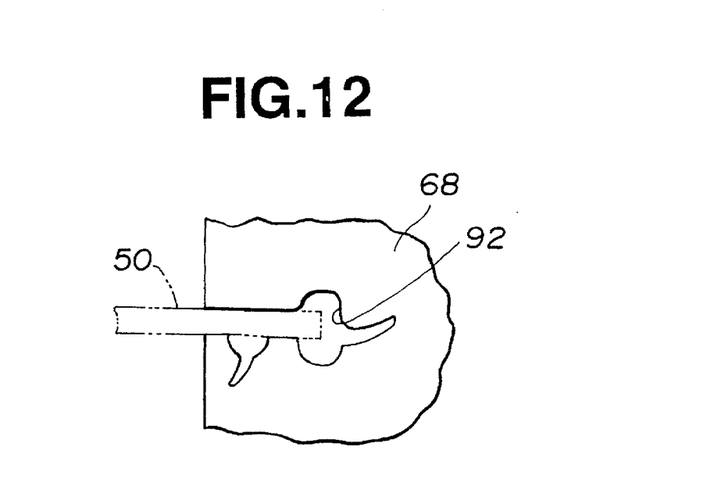
FIG. 12 is a partial elevational view showing a modified shape of an orifice of an extrusion dic according to the present invention.
Figure 13:
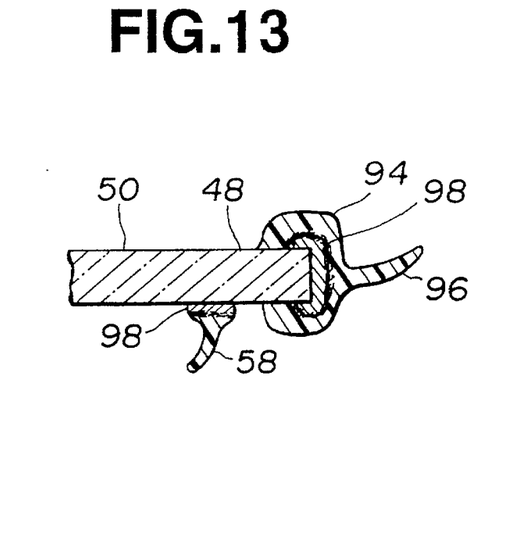
FIG. 13 is a view similar to FIG. 6, but showing a window glass on which a molding and a dam have been formed using the extrusion die having the orifice shown in FIG. 12.

FIG. 12 is a partial elevational view showing another exemplary orifice 92 of the minor portion 68 of the extrusion die 4. By the use of this orifice 92, a molding 94 having a lip portion 96 and a dam 58 are formed on the peripheral edge 48 of the window glass 50 (see FIG. 13). Designated by numeral 98 are adhesive layers. As is known, the dam 58 serves to suppress over flow of a urethane sealer for securing the window glass 50 to an automotive body (not shown).

In the following, an exemplary apparatus arrangement for extruding a molding on a peripheral edge of a window glass in an industrial scale will be described. As is seen from FIG. 15, designated by numeral 200 is a first supporting device for supporting window glass plates 202 on each of which a molding is to be extruded. Designated by numeral 204 is a second supporting device for supporting window glass plates on each of which a molding has been extruded. A holding device 206 is positioned very close to an extrusion die 208 and serves to hold and move each window glass plate relative to the extrusion die 208. A first robotic arm 210 transfers each window glass from the first supporting device 200 to the holding device 206 for extruding a molding thereon. After the extrusion, a second robotic arm 212 transfers each window glass from the holding device 206 to the second supporting device 204.

Figure 17:
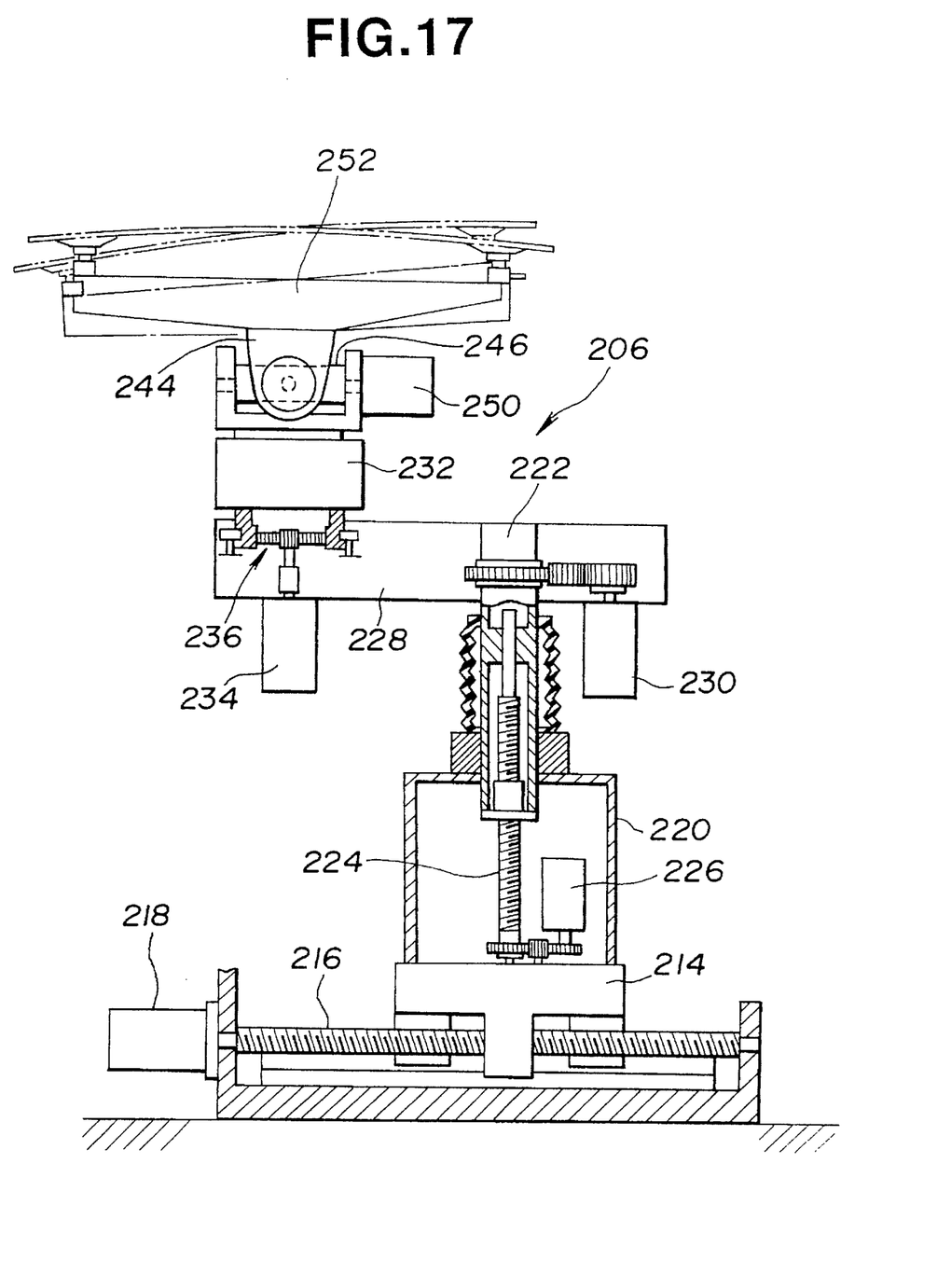
FIG. 17 is an elevational view taken in the direction of the arrow "B" of FIG. 16.

As is seen from FIG. 17, the holding device 206 has a sliding table 214 which is threadtally engaged with a driving shaft 216. This driving shaft 216 is rotated in either direction by a motor 218. By the rotation of this driving shaft 216, the sliding table 214 is slid in either direction, i.e. either left or right in FIG. 17. By the sliding movement of sliding table 214, the peripheral edge of each window glass is inserted into the side openings of the extrusion die or removed therefrom. A supporting base 220 is mounted on the sliding table 214. A cylinder 222 is threadedly engaged with a drive shaft 224. This drive shaft 224 is rotated in either direction by a motor 226. By the rotation of this driving shaft 224, the cylinder 222 is allowed to rise or fall. A first arm is 228 rotatably engaged with the cylinder 222 so that the first arm 228 is rotated by a motor 230 relative to the cylinder 222. A second arm 232 is rotatably engaged with the first arm 228. In fact, the second arm 232 is rotated relative to the first arm 228 by a motor 234 through a planetary gear arrangement 236.

Figure 18:
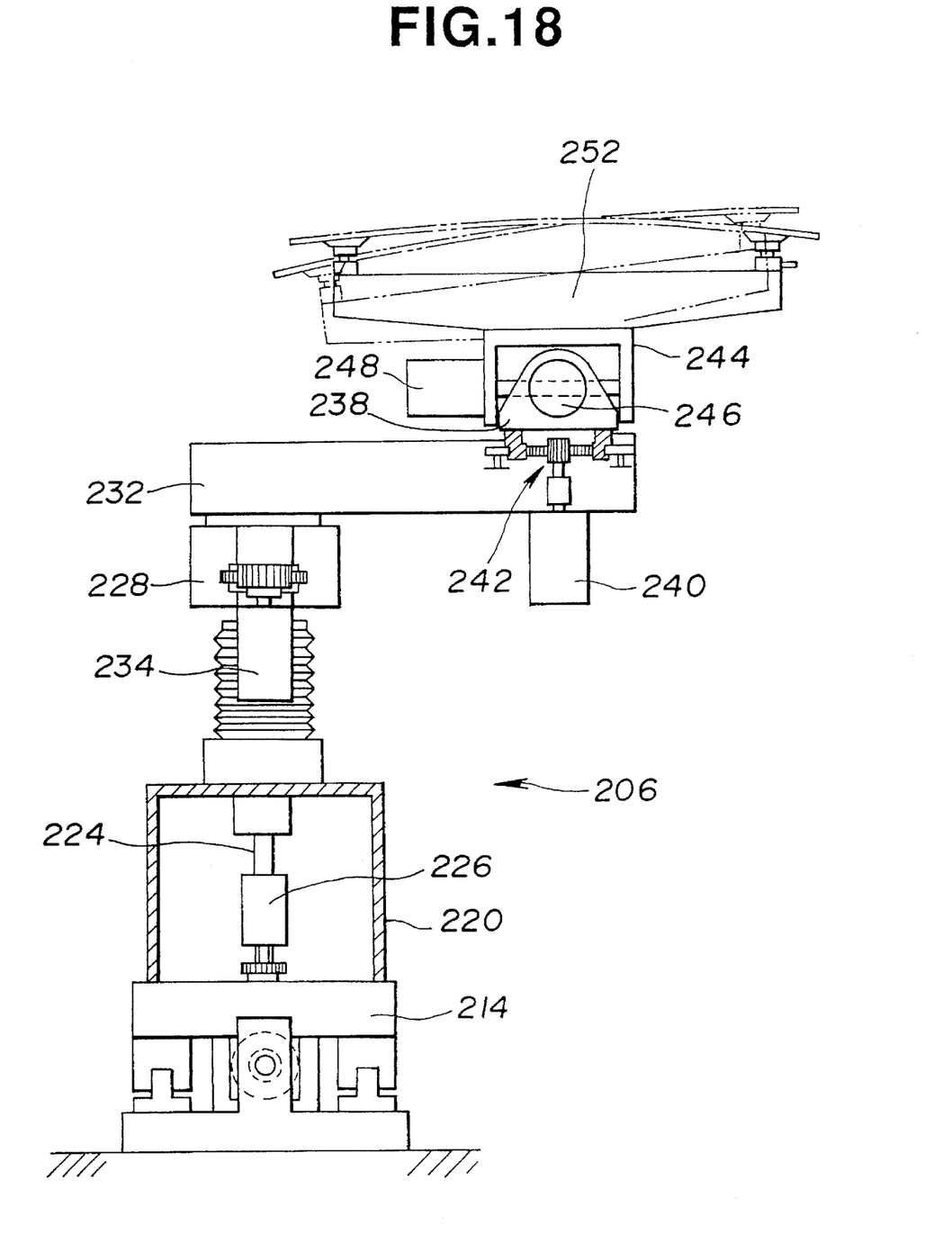
FIG. 18 is an elcvational view taken in tile direction of the arrow "C" of FIG. 16.

As is seen from FIG. 18, a rotatable base 238 is rotatably engaged with the second arm 232. In fact, the rotatable base 238 is rotated relative to the second arm 232 by a motor 240 through a planetary gear arrangement 242. A tiltable base 244 is tiltably supported on the rotatable base 238 through a cross 246. In fact, the tiltable base 244 is tilted by a first motor 248 in either the left or right direction in FIG. 17, as illustrated. Furthermore, the tiltable base 244 is tilted by a second motor 250 in either the left or right direction in FIG. 18, as illustrated. A window glass holding member 252 is fixed to the flitable base 244. This holding member 252 comprises four arms 254 each having a vacuum cup 256.

Operation of the above extruder arrangement will be briefly explained in the following. At first, a window glass plate 202 is transferred from the first supporting device 200 to the holding device 206. That is, this glass plate 202 is placed on the vacuum cups 256 of the holding device 206. Then, vacuum is applied to the cups 256 to securely hold thereon the glass plate 202. Then, the peripheral edge of the glass plate is inserted into the side openings of the extrusion die 208 by sliding the table 214 toward the extrusion die 208. Then, while the glass plate 202 is moved by the holding device 206 in a precisely controlled manner, the adhesive layer and the molding are formed on the peripheral edge of the glass plate 202, as explained above. After the completion of the formation of the adhesive layer and the molding, the glass plate is transferred from the holding device 206 to the second supporting device 204 for shipping.

The following nonlimitative examples are illustrative of the present invention.

EXAMPLE 1

In this example, a molding was extruded on a peripheral edge of a window glass, using the extrusion die arrangement shown in FIG. 1 in the following manner. A thermosetting adhesive was used as the adhesive, and two different types of vinyl chloride resin were used for extruding a major portion of the molding and a lip portion of the molding, respectively. As the window glass, a float glass plate having a length of about 1350 mm, a width of about 950 mm and a thickness of about 3.5 mm which had been suitably bent was used. Unlike the extruder arrangement shown in FIG. 1, first and second extruders were used for the extrusion of the major portion and the lip portion of the molding, respectively. The temperatures of the first and second extruders and the extrusion die were respectively maintained within a range from about 125° C. to about 160° C. during the extrusion so as to heat the molding materials at a temperature within this range. The first extruder had a single screw having a ratio of its length (L) to its diameter (D) of 13. The second extruder had twin screws. A flexible pipe made of TEFLON (a trade name), covered with a stainless steel net and then with a band heater, was used for connecting each of the first and second extruders to the void space 28 (see FIG. 1). In fact, the flexible pipes were heated by the band heater during the extrusion so as to suitably heat the molding materials.

As the thermosetting adhesive, ARON α 952H-2 which is an α-cyanoacrylate adhesive and a trade name of TOA GOSEI CHEMICAL INDUSTRY CO., LTD and ARON MIGHTY FS-10 which is a nylon adhesive and a trade name of TOA GOSEI CHEMICAL INDUSTRY CO., LTD were used.

While the glass plate was suitably moved relative to the extrusion die at a specifically controlled speed, the molding materials were respectively extruded from the first and second extruders onto the peripheral edge of the glass plate, substantially simultaneously with the application of the thermosetting adhesive thereonto. In fact, the thermosciting adhesive was applied to the peripheral edge of the glass plate from the adhesive supply pipe 42 through a pump 44 (see FIG. 1). The first molding material was extruded from the first extruder with an extrusion rate (i.e. extrusion length per unit time) of 40 m/min, and the second molding material was extruded from the second extruder with an extrusion rate of 20 m/min. During the extrusion, the glass plate was suitably moved at a speed of about 1 m/mm relative to the extrusion die.

The thus extruded and cooled down major portion of the molding was a semi-hard polyvinyl chloride (PVC) having a hardness of about 93° according to Japanese Industrial Standards (JIS) A hardness, and the thus extruded and cooled down lip portion of the molding was a soft (plasticized) PVC having a hardness of about 70° according to JIS A hardness. The thickness of the adhesive layer was several tens micrometers. The molding adhered to the glass plate with a sufficient and controlled adhesion. In fact, bond strength of the molding to the glass plate was not less than about 15 kg/cm². This is much better than bond strength of the prior art. The glass plate after the extrusion did not have scratches. Furthermore, the molding was superior in surface finish and dimensional precision. The molding did not have scratches nor creases.

EXAMPLE 2

In this example, a molding was extruded onto a peripheral edge of a window glass with the extrusion die shown in FIG. 7 in the following manner. A thermoplastic adhesive was used as an adhesive, and a vinyl chloride resin was used as a molding material. As the window glass, the same float glass plate as that of Example 1 was used. First and second extruders were used for extruding the molding and the adhesive layer, respectively. The first extruder had the same single screw as that of the first extruder of Example 1. Furthermore, the second extruder had the same twin screws as those of the second extruder of Example 1. The same flexible pipe as that of Example 1 was used for connecting each of the first and second extruders to the void space 72

(see FIG. 7). As the thermoplastic adhesive, AROMELT PES-118EE which is a copolymerized polyester and a trade name of TOA GOSEI CHEMICAL INDUSTRY CO., LTD and VC-A which is a polyester and a trade name of SUMITOMO CHEMICAL CO., LTD were used.

As is similar to Example 1, the molding material was extruded from the first extruder with an extrusion rate of 40 m/mm, and the adhesive material was extruded from the second extruder with an extrusion rate of 20 m/min. During the extrusion, the glass plate was suitably moved at a speed of about 1 m/min relative to the extrusion die.

The thus extruded and cooled down molding was a soft (plasticized) PVC having a hardness of about 70° according to A hardness. The thickness of the adhesive layer was several hundreds micrometers. The molding adhered to the glass plate with a sufficient and controlled adhesion. In fact, bond strength of the molding to the glass plate was not less than about 5 kg/cm². This is worse than the bond strength of Example 1, but satisfactory for practical use. The glass plate and the molding formed thereon were superior as those of Example 1.

The boundary condition between the molding and the adhesive layer was observed with a microscope of about one hundred magnifications, and its photograph was taken. FIG. 14 is a schematic view which is a reproduction of this photograph. As is clearly shown in FIG. 14, the boundary surface is uneven or rough. At this boundary 89, the thermoplastic resin of the adhesive layer 90 and the thermoplastic polymer of the molding 88 were fused together and blended with each other (see FIG. 14). Thus, adhesion of the molding to the adhesive layer became much improved, considering that the adhesive layer is made of a thermoplastic resin.

EXAMPLE 3

In this example, Example 2 was substantially repeated except in that the first extruder of Example 2 was omitted, that the second extruder of Example 2 was used for extruding the molding material (vinyl chloride resin), that the type of adhesive was changed, and that a hot melt adhesive applicator was used for applying the adhesive. As the adhesive, MELTORON HB-061 which is a hot melt butyl adhesive and a trade name of DIABOND INDUSTRY CO., LTD was used.

The extruded and cooled down .molding was a soft PVC having a hardness of about 70° according to JIS A hardness. The bond strength of the molding to the glass plate was not less than 2.5 kg/cm². This is also worse than the bond strength of Example 1, but satisfactory for practical use. The glass plate and the molding extruded thereon were superior as those of Example 1.

EXAMPLE 4

In this example, Example 3 was substantially repeated except in that the type of adhesive was Changed. As the adhesive, HAMATIGHT HOTMELT M-120 which is a thermoplastic hot melt butyl adhesive and a trade name of YOKOHAMA RUBBER CO., LTD was used.

The extruded and cooled down molding was a soft PVC having a hardness of about 70° according to JIS A hardness. The bond strength of the molding to the glass plate was not less than 2.5 kg/cm². The glass plate and the molding extruded thereon were superior as those of Example 1.

What is claimed is:

1. A method for producing a plate article having an adhesive layer and a molding, said adhesive layer being formed on a peripheral edge of said plate article, said molding covering said adhesive layer and being formed on said peripheral edge, using an extrusion die comprising a first space for supplying an adhesive to said peripheral edge and a second space for supplying a molding material to said peripheral edge, said method comprising the steps of:

(a) inserting said peripheral edge into said first and second spaces;

(b) moving said plate article relative to said extrusion die while said peripheral edge is kept inserted in said first and second spaces;

(c) applying said adhesive from said first space to said peripheral edge so as to form said adhesive layer thereon, said adhesive being a thermoplastic hot melt adhesive; and (d) extruding said molding material from said second space onto said adhesive layer substantially simultaneously while the step (c) is conducted, said molding material being a thermoplastic resin, wherein said first and second spaces are so arranged relative to each other such that said molding and said adhesive layer are substantially simultaneously formed on said peripheral edge and that said adhesive layer is covered with said molding.

2. A method according to claim 1, wherein said first and second spaces are united with each other, and wherein said first space is substantially enclosed with said second space such that said adhesive layer is covered with said molding.

3. A method according to claim 1, wherein said first space is positioned away from and immediately upstream said second space with respect to a direction in which said platetike article is moved relative to said extrusion die, such that said molding is formed on said peripheral edge portion substantially simultaneously with the formation of said adhesive layer on said peripheral edge.

4. A method according to claim 1, wherein, at the step (b), said extrusion die is fixed at one position and said plate article is moved relative to said extrusion die.

5. A method according to claim 1, wherein said molding material is extruded with a controlled extrusion rate and said platelike article is moved at a controlled speed such that said molding has a substantially uniform cross section thereof throughout said peripheral edge.

6. A method according to claim 1, wherein said adhesive is heated at a certain controlled temperature in said first space during the step (c), and wherein said molding material is heated at a certain controlled temperature in said second space during the step (d).

7. A plate article having an adhesive layer and a molding, said adhesive layer being formed on a peripheral edge of said plate article, said molding covering said adhesive layer and being formed on said peripheral edge, said adhesive being a thermoplastic hot melt adhesive, said molding being a thermoplastic polymer, a boundary between said adhesive and said molding having a rough surface, said adhesive and said molding being fused together at said boundary, said plate article being prepared in accordance with the method of claim 1.

8. A method according to claim 6, wherein said certain controlled temperature of said adhesive is within a range from about 125° C. to about 160° C., and wherein said certain controlled temperature of said molding material is within a range from about 125° C. to about 160° C.

* * * * *